(12) United States Patent
Fahner et al.

(10) Patent No.: US 9,721,267 B2
(45) Date of Patent: Aug. 1, 2017

(54) COUPON EFFECTIVENESS INDICES

(75) Inventors: Gerald Fahner, Austin, TX (US);
Zhenyu Yan, Sunnyvale, CA (US);
Shafi Rahman, Bangalore (IN); Amit Kiran Sowani, Mumbai (IN)

(73) Assignee: FAIR ISAAC CORPORATION, Roseville, MN (US)

( * ) Notice: Subject to any disclaimer, the term of this patent is extended or adjusted under 35 U.S.C. 154(b) by 556 days.

(21) Appl. No.: 12/971,610

(22) Filed: Dec. 17, 2010

(65) Prior Publication Data
US 2012/0158474 A1 Jun. 21, 2012

(51) Int. Cl.
*G06Q 30/00* (2012.01)
*G06Q 30/02* (2012.01)

(52) U.S. Cl.
CPC ..... *G06Q 30/0211* (2013.01); *G06Q 30/0242* (2013.01)

(58) Field of Classification Search
CPC ... G06Q 99/00; G06Q 30/00; G06F 17/30598
USPC .......................................... 705/14.13, 14.41
See application file for complete search history.

(56) References Cited

U.S. PATENT DOCUMENTS

| | | |
|---|---|---|
| 6,684,195 B1 | 1/2004 | Deaton et al. |
| 8,682,762 B2 | 3/2014 | Fahner |
| 2005/0159921 A1* | 7/2005 | Louviere ............... G06Q 30/02 702/181 |
| 2005/0171848 A1 | 8/2005 | Walker et al. |
| 2007/0260521 A1* | 11/2007 | Van Der Riet ........ G06Q 30/02 705/14.53 |
| 2008/0262928 A1 | 10/2008 | Michaelis |
| 2008/0270231 A1 | 10/2008 | Li et al. |
| 2010/0049538 A1 | 2/2010 | Frazer et al. |
| 2010/0082469 A1* | 4/2010 | Oliveira ................ G06Q 40/02 705/35 |
| 2011/0191282 A1* | 8/2011 | Chan ..................... G06Q 30/02 706/52 |

OTHER PUBLICATIONS

"R Package 'smbinning': Optimal Binning for Scoring Modeling", by Joseph Rickert. Mar. 24, 2015. pp. 1-3.*
PCT International Search Report and Written Opinion dated May 31, 2012 for corresponding PCT Application No. PCT/US2011/065281.

(Continued)

*Primary Examiner* — William A Brandenburg
(74) *Attorney, Agent, or Firm* — Mintz Levin Cohn Ferris Glovsky and Popeo, P.C.

(57) ABSTRACT

Profiles characterizing each of a plurality of consumers are received. Thereafter, each profile is associated with one of a plurality of customer segments (e.g., matched pairs, etc.). Thereafter, a coupon effectiveness index is determined for each of the plurality of consumers for an offering based on the associated customer segment. The coupon effectiveness indices model characterizes causal effects estimates determined using historical data of purchases of individuals having varying coupon treatments for the offering. Subsequently, provision of at least a portion of the determined coupon effectiveness indices is initiated. Related apparatus, systems, techniques and articles are also described.

20 Claims, 2 Drawing Sheets

(56) References Cited

OTHER PUBLICATIONS

Nicholas J. Radcliffe et al., "Differntial Response Analysis: Modeling True Responses by Isolating the Effect of a Single Action", Proceedings of Credit Scoring and Credit Control VI., Credit Research Centre, University of Edinburgh Management School (1999).
Donald B. Rubin, "Estimating Causal Effects from Large Data Sets Using Propensity Scores", Annals of Internal Medicine, 127:757-763 (1997).
Donald B. Rubin, et al., "Estimating the Causal Effects of Marketing Interventions Using Propensity Score Methodology", Statistical Science, vol. 21, No. 2 (2006).
Donald B. Rubin, "Matched Sampling for Causal Effects", Cambridge University Press (2006).

* cited by examiner

COUPON EFFECTIVENESS INDICES

TECHNICAL FIELD

The subject matter described herein relates to coupon effectiveness indices. In particular, scalable, automated, causal modeling-based system, methods, and articles are provided to characterize customers by their differential and multi-dimensional responses to personalized coupon offerings.

BACKGROUND

A coupon is a marketing instrument that can be exchanged for a price discount. Retailers and manufacturers distribute discount coupons for a variety of reasons, including, but not limited to: price sensitivity testing, demand generation, increasing sales, promoting store traffic, encouraging new product trial, triggering brand switching, promoting loyalty, and for encouraging club membership renewal.

Coupons are often widely and rather indiscriminately distributed via circulars, newspapers, or the internet. Increasingly, data-driven retailers and online merchants seek to leverage massive sales and marketing databases to target coupons more strategically to specific markets, customer segments, and with increasingly personalized execution channels, even down to the individual consumer, in order to sharpen the coupons' relevance for the recipients, and with it the desired impact on the business. Ill-designed couponing campaigns also carry their risks, perhaps most notably revenues and margins erosion, upping the ante for couponing strategy development.

Coupon redemption models that offer coupons to those individuals who are most likely redeeming their coupons are often too simplistic for many business objectives. Targeting customers with high redemption likelihoods is the optimal strategy if the goal is to maximize coupon redemption, and some retailers consider this as a reasonable strategy to deepen loyalty with their customer. However, retailers who want to maximize other important business metrics, such as revenue, do not always benefit from these models. Indeed, such models often give coupons to customers who would have purchased the offered product anyway. As a result, such customers may just purchase the same amount of the product, but at the discounted price, resulting in limited sales gains and potentially lowering revenue.

SUMMARY

In one aspect, profiles characterizing each of a plurality of consumers are received. Thereafter, each profile is associated with one of a plurality of customer segments Thereafter, a coupon effectiveness index is determined for each of the plurality of consumers for an offering based on the associated customer segment. The coupon effectiveness indices model characterizes causal effects estimates determined using historical data of purchases of individuals having varying coupon treatments for the offering. Subsequently, provision of at least a portion of the determined coupon effectiveness indices is initiated.

The provision of the coupon effectiveness indices can comprise one or more of: displaying at least a portion of the determined coupon effectiveness indices, persisting at least a portion of the determined coupon effectiveness indices, and transmitting data characterizing at least a portion of the determined coupon effectiveness indices.

One or more transactions can be initiated based on the determined coupon effectiveness indices. In addition or in the alternative, subsequent offerings can be optimized according to one or more pre-defined business objectives using the determined coupon effectiveness indices. The optimizing can include assigning unique coupons or coupon combinations to consumers subject to product and/or service specific coupon volume limitations. As can be appreciated, an offering can relate to a wide variety of items including products and services and/or a coupon related thereto.

The historical data can comprise line item transaction data to analyze and identify historical coupon marketing targeting activity and resulting customer purchase activities. The customer purchasing activities can include coupon redemption data. The historical data can further include validity periods during which a corresponding coupon was effect. The historical data can comprise demographic data for the individuals and/or non-purchase related data associated with historical purchases (e.g., weather conditions on date of purchase).

Varying coupon treatments for the offering can include providing a coupon (or one of a series of discount levels) or not providing a coupon to the corresponding individual.

The customer segments can be processed to generate matched samples of treated and control units (at two or more treatment levels). The matched samples can be pair-wise disjoint. Non-parametric estimates of individual-level causal treatment effects can be determined for matched pairs of treated and control units. There can be more than two treatment levels and, in such cases, a score development sample can be generated with covariates and target values for each matched sample.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. Methods can be implemented by one or more data processors (in a single computing system or distributed among several computing systems).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
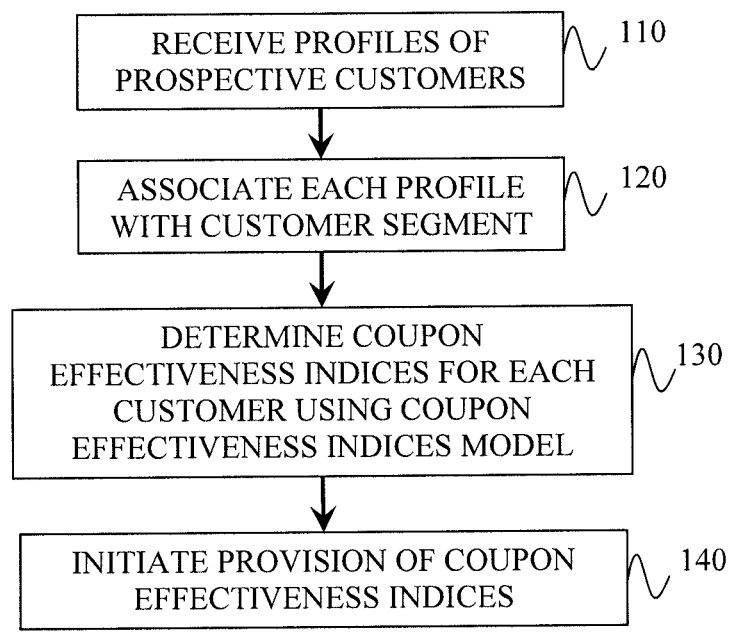
FIG. 1 is a process flow diagram illustrating the assignment of coupon effectiveness indices to a plurality of prospective consumers.

The current subject matter provides a highly scalable, automated modeling platform for creating coupon effectiveness Index (CEI) models. Developing CEI models is a complex process considering the following facts for a large retailer/manufacturer:

There are typically 1000s of products;
Multiple types of coupons can be offered for a single product; and
Different business objectives can drive the coupon campaigns.

One model can be required for each unique combination of the above there dimensions. This can easily translate into 10s of 1000s of models. Even if multiple types of coupons on a single product are clubbed together, number of models still remains very large. The current subject matter provides CEI models for each combination of the above three dimensions. CEI scores can be generated using such CEI models which are in turn used to transform predictions into actions such as individualized coupon assignments.

The techniques described herein can be implemented or integrated into an automated sub-system sitting within a larger system for retail action management and optimization system (such as the system described in U.S. patent application Ser. No. 12/197,134, the contents of which are hereby fully incorporated by reference). This system can implement highly automated processes to develop multiple coupon effectiveness Index (CEI) models for multiple, user-specified products, for which there exists previous coupon marketing experience.

In addition, products for which there is sufficient data can be automatically identified based on obtaining a sufficient number of matches from the matching process to warrant development of robust CEI uplift models. In addition, if there is sufficient matched data, these models are automatically developed. The system can output its results ("CEI Table) into an optimization process. The optimization (as described in the '134 patent application) assigns unique coupons or coupon combinations to customers subject to product-specific coupon volume limitations (given by an external marketing budget). As a result, any given customer may receive none, one, or several coupons that uniquely target him/her based on the expected increase in sales due to the coupon, and within the bounds of the marketing budget. The quantity and the content of coupons is subject to the format of the campaign and side constraints.

The task of the optimization process is to select the best coupon(s) (if any) for any given customer. The optimization process can input CEI scores for products where the CEI models and scores are available, or alternatively (for products where CEI models could not be developed) it can input coupon redemption scores (i.e., scores characterizing the likelihood of an individual to redeem a coupon which does not take into account specific business objectives of sales or revenue growth), or propensity scores (i.e., scores characterizing the likelihood of an individual to purchase a product which does also not take into account specific business objectives of sales or revenue growth). The goal of the optimization process is to set the objective and constraints based on available data feeds and campaign settings. The result of the optimization process is the set of decision made regarding the coupon selection for every individual subject to campaign restrictions.

A business user can select the appropriate outcome whose increment the CEI models are supposed to predict. The outcome should be specified in accordance with the business goals. For example, if the goal is to increase sales or revenue of the recommended product, the outcome should be sales or revenue. If the goal is to increase general store traffic, the outcome could be the number of store visits within a specified time interval, etc. In cases where multiple objectives are relevant or the final objective could not be decided at model development time, the user may develop multiple CEI models for multiple outcomes in advance, and combine them or use them as needed in the optimization.

CEI models can be built using historical campaign data (i.e., data relating to previous coupon offerings, etc.) with valid offers extended to customers and their coupon redemption history. In particular, CEI modeling can use post-campaign line item transactional data (i.e., transactional data based on individual SKUs, etc.) to analyze and identify coupon redemption. Coupon details can provide information related to the product, type and quantum of offers as well as the validity duration. For the simplest of the implementations, the historical data only comprises the product information for each coupon. Coupon validity duration information can allow for the interpretation of the historical purchases as redemption of the coupons. Alternatively, redemption tags (i.e., tags within the dataset that characterize the coupon and/or the coupon redemption, etc. can be provided either in the post campaign line item data or in the coupon offer data.

CEI models can be based on the results of a marketing campaign driven by analytic models. The campaigns can be driven by these models' scores as an input to determine coupon offers for each customer. These scores can be determined for each customer using the underlying predictor variables. This campaign scoring data can be helpful in CEI model creation. The campaign scoring data can be represented by the customer transaction profile variables created from historical line item data as well as demographic data either for time to event (TTE) (for example, see, U.S. patent application Ser. No. 12,197,134) or for CEI scoring in the production environment, and optionally, the corresponding scores that were used to determine offer recommendations for the customers (as described earlier). The CEI models and the manner they led to the offers and their recommendations have interrelationships which can be exploited as described herein.

Once the historical data sets are obtained, the modeling can commence. The related modeling steps are highly scalable and automated. They are designed to use smaller subsets of the transaction data and campaign scoring data inputs (generically called splits and process them on a parallel processing platform, like CONDOR (which is part of the CONDOR Project), before aggregating the outputs of the parallel processes to generate a comprehensive output that could be used for the subsequent modeling steps, again done using parallel processing.

Campaign scoring data, which includes the customer transaction profile and demographic variables and Time to Event and/or CEI scores contains millions of line items. For processing efficiency this large dataset is split typically into 1000 smaller datasets based on the customer IDs. These split files are loaded in parallel within the modeling platform. Historical coupon offer data, and the corresponding post campaign line item data or coupon redemption tags can also be split and loaded in parallel in the modeling platform.

Based on the coupon offer data, customers in the campaign scoring data are tagged as "treated" or "control" depending on whether they were offered the coupon or not. Multiple "treatment" tags can be generated one for each product under consideration.

Bernoulli Likelihood scorecard models (i.e., scorecard models using Bernoulli regression) can be created for each offered product coupon using scorecard model training algorithms to determine the probability of a customer to be given the corresponding coupon offer. The binary targets for these models can be the historic binary treatment tags. This process is similar to performing "logistic regression" on the historic coupon treatments. However, scorecards are more flexible models than logistic regression models in their ability to capture nonlinear relations and hence the resulting scores can more accurately model these treatment probabilities. To achieve this in a fast and reliable way if the data size is very large, stratified down sampling of the split datasets can be done for each product being considered. This can be done in parallel for each split.

Then for each product, all the down sampled splits can be merged together. This is done in parallel for each product. This creates one training dataset for each product with the "treatment" tag and the customer transaction profile, demographic and corresponding product score from the campaign scoring as the input variables.

Once the training datasets are available, automated fine binning of each product dataset is done in parallel. Fine binning as used herein is a process in which the predictive continuous variables that go into a scorecard (such as recencies, frequencies and monetary values of previous purchases, or demographics like customer age, income etc.) can be discretized into small intervals, such that each interval can contribute to the score independent of the other intervals, which provides the capacity for a scorecard to fit complex nonlinear relations between the predictors and the target. The output of fine binning is run through an automated variable reduction algorithm in parallel. Using the "treatment" tag as the target, Bernoulli likelihood scorecard models can be trained for each product in parallel.

The Bernoulli likelihood scorecard models can be developed and scored in parallel for each coupon type in the historic data set. Customers from the "treated" and "control" groups can be identified in a matching process such that for a given "treated" customer the process is trying to find a "control" customer with approximately the same Bernoulli Likelihood score. As a matching control cannot always be found for every treated, this matching may lead to dropping of many customers. However the benefit is that the resultant matched customer list will represent an unbiased matched sample of customer pairs that are similar except for the coupon treatment they had received. IDs of matched customer are retained for each product. To speed up the matching process, ten split lists for each product can be generated and used to parallelize this matching process. Using the offer validity period and the post campaign line item data, a performance target is identified for the matched customers.

Based on the business objective, a relevant tagging mechanism can be used for generating the performance target. For instance, if the goal of the business objective is to increase the number of offered items purchased then the performance metric is the number of items purchased during the offer period for the offered product. Uplift tags can be generated as the difference between the performance values of the matched customers. The same value can be assigned to both matched customers as the uplift target. Down sampling of this dataset can be done in parallel for each product, leading to creation of training datasets for CEI scorecard model training. These operations can be performed for each and every product simultaneously for each of the splits. These splits can be processed in parallel.

Once the training datasets for CEI modeling are available, automated fine binning of each product dataset is done in parallel (the fine binnings for the CEI model will in general differ from the fine binnings for the Bernoulli Likelihood scorecards) The uplift tags computed in the previous step are used as target and the customer transaction profile and demographic variables from the campaign scoring are used as potential predictors (the corresponding product score from the campaign scoring is not used as a predictor). The output of fine binning is run through an automated variable reduction algorithm in parallel. Using the uplift tag as the target, least square scorecard models can be trained for each product in parallel using scorecard model training algorithms (just as Bernoulli Likelihood scorecards are more powerful models than ordinary logistic regression, least square scorecards are more powerful models than ordinary least squares regression). Automated model performance validation based on an independent test sample not used for model development can be done to ensure that the trained CEI models are statistically sound and generalize well on unseen data.

The CEI models consume historical transaction data and demographic data to generate the CEI score for each customer. As stated above, their scores are interpreted based on the business objective metric. For instance, if the business objective metric was to increase the number of offered items purchased then the score is interpreted as the expected incremental items purchased if offered the product coupon. Alternatively, CEI scores can be scaled to an arbitrary scale (e.g. z-scale or a scale from 1-100) to be used as a non-calibrated rank ordering instrument. More specifically, a time series of retail customer purchase transactions and any other static or quasi-static data that can be obtained about the customers (demographic data, loyalty data, etc.) can be inputted into the CEI models. A time series of marketing activities (e.g., previously offered coupons, etc.) can also be offered. As typical retailers send out many different types of coupons, and because the responses of different customers will depend in unique ways on the type of coupon they receive, the system can automatically build as many models as there are types of coupons.

CEI scores are designed to rank order units (customers) according to expected differences of their potential outcomes (e.g. purchases, revenue), given a change in treatment:

$$S \sim \frac{\Delta \text{Potential Outcome}}{\Delta \text{Treatment}}$$

In the following, a given outcome dimension (e.g. response) and a general treatment dimension (e.g. price) are considered. There can be two or more treatment levels. Given usual identifiable conditions, the above quantity can be defined, for example, as a causal effect within the framework of a Rubin Causal Model (see Rubin, D. B., Estimating Causal Effects from Large Data Sets Using Propensity Scores. *Annals of Internal Medicine*, Vol. 127, Issue 5, Part 2, 757-763 (1997), the contents of which are hereby incorporated by reference) when the treatment levels are dichotomous (i.e., Δ Treatment switches between two treatment levels). To define the sign of the effect, for illustration purposes, it can be assumed that there are ordered treatment levels, such that Δ Treatment switches from a lower to a higher level, e.g. from "No Coupon" to "Coupon", from "Low Price" to "High Price", generically, from "Control" to "Treatment". An example of two or more treatment levels can be when there are variably priced coupons—so instead of the decision simply being coupon/no coupon, there can be different coupon discounts offered in connection with a particular product or service.

When there are more than two treatment levels, the derivative will generally depend on the base level, $T_0$, from where it can be changed, as well as the extent of the change (i.e., how far or over how many levels we change the treatment, etc):

$$\left.\frac{\Delta \text{Potential Outcome}}{\Delta \text{Treatment}}\right|_{T_0}$$

In this situation, assigning a single number or score for a unit's sensitivity to coupons (i.e., coupon effectiveness for this unit, etc.) is generally insufficient. For example, a unit can have different potential outcome differences when switching from Low to Medium Price, as compared to switching from Medium to High Price. The response behavior along the treatment dimension can be characterized by the treatment-response curve. Estimating treatment-response curves can be required for high-precision decision modeling and optimization tasks, such as pricing or limit optimization, when the treatment decision has multiple levels. However, estimating entire treatment-response curves can be difficult and requires a complex analytic process. Much of the complexity may be avoided if the goal of an analysis is exploratory or descriptive, for example, geared towards customer segmentation. It may then be sufficient to create an "omnibus" score for coupon effectiveness—a single number that captures the overall steepness of the treatment-response curve, loosely speaking. Such a score can for example help to generate actionable segments that broadly speaking differ by their price sensitivity. For this purpose, a heuristic can be provided to aggregate (loosely speaking) all treatment sensitivities across all levels of treatment changes, into a single CEI score value.

In the following, a situation is described with two treatment levels, which also often arises in practice (for example, yes/no coupon decisions). Thereafter, a heuristic extension is described to deal with multiple treatment levels. Two methods to develop the CEI score are described.

Dichotomous treatments. In cases in which there are pair-wise matched samples of treated and control units, for each pair, an unbiased, nonparametric estimate of the individual-level causal treatment effect for the two units forming the pair can be obtained by subtracting the observed outcome of the control unit from the observed outcome of the treated unit:

TABLE 1

| Matched Pair | Treated or Control? | Observed Outcomes | Treatment Effect Estimates |
|---|---|---|---|
| $u_1$ | C | $Y_1$ | $Y_2 - Y_1$ |
| $u_2$ | T | $Y_2$ | $Y_2 - Y_1$ |

Nonparametric estimates can be obtained; provided, however, that (i) there can be high variance due to noise in the observed outcomes and due to the generally infeasible problem to match two units exactly on all covariates (one can typically only match "in expectation", using a method such as matching based on the propensity score (which can be implemented using Bernoulli Scorecards)); and (ii) estimates are only available for the units in the matched sample. To overcome these difficulties, a score can be developed on the matched sample to predict the treatment effect estimates from the covariates, which is what the CEI score does. The score can be developed as a regression function that smoothes the treatment effect estimates (overcoming the first aforementioned problem), and can also be used to predict the effects for units outside the matched sample or for new units (overcoming the second aforementioned problem) The score development data for a matched sample of size M can be given by:

TABLE 2

| Unit | Covariate vector | Target |
|---|---|---|
| $u_1$ | $X_1$ | $Y_2 - Y_1$ |
| $u_2$ | $X_2$ | $Y_2 - Y_1$ |
| ... | ... | ... |
| $u_{M-1}$ | $X_{M-1}$ | $Y_M - Y_{M-1}$ |
| $u_M$ | $X_M$ | $Y_M - Y_{M-1}$ |

In the above Table 2, the odd units are in the control group and the even units are in the treated group, and consecutive odd-even units form matched pairs. The resulting score models $\Delta$ Potential Outcome as a function of the covariates:

$$S(X) = E[Y^T - Y^C | X] \quad \text{(CEI score)}$$

The score can be developed, for example, as a Least Squares-Scorecard, which can improve accuracy over ordinary least squares regression. The CEI score can also have a causal interpretation as the expected difference in potential outcomes due to a switch between the two defined treatment levels.

In situations in which there are more than two treatment levels (e.g. three alternative coupons for the same product but with three different price discounts of 5%, 10%, and 20% discount), all matched samples between all pairs of treatments can be generated. It can be assumed that L matched samples of sizes $M_1, \ldots, M_L$, are obtained. For each matched sample, a score development sample can be generated with covariates and target values exactly as described for the dichotomous treatment case above. When calculating the target values, absolute treatment levels can be ignored, i.e. the target values can be defined simply as differences between treated and control outcomes, no matter what levels "Treated" and "Control" actually encode—except for the fact that "Treated" always needs to correspond to a higher level of the ordinal treatment variable than "Control". Such a heuristic is directional only and can be used when the treatment can be considered as ordinal (such as pricing or discounts)

The CEI score development sample can be given by the union of the above development samples and is of size $\Sigma_{l=1}^{L} M_l$. As a consequence of the heuristic nature of assembling a combined development sample in the multiple treatment case, the fitted CEI score $S(X)$ cannot be interpreted as an estimator of a well-defined causal effect. However, the score can be characterized as ranking order units according to their sensitivities, by aggregating directional signals across multiple matched samples.

In some cases a pre-smoothing method can be used. Pre-smoothing and sample enlargement can be advantageous in situations with low signal/noise and/or low matched sample counts. In particular, there can be scenarios in which it is advantageous to substitute model-based causal treatment effect estimates as targets for developing the CEI score (because the rather noisy nonparametric treatment effects estimates). For this, individual effects from regression modeling of the causal treatment effects can be estimated. Depending on the settings for the effect estimation module, these effects can be generated for the matched samples only, or for the common support samples, or even for all observations. In addition, estimates can be used for common support samples, rather than for the matched samples, which can result in an increase of the sample size for CEI score development.

In one example, a retailer offers coupons for three products: milk, bread, and eggs. The current subject matter was used to automatically develop a CEI model for milk, another CEI model for bread, and another CEI (milk). Moreover, in this example, there are two coupon variants for milk, namely a 10% discount and a 20% discount. The current subject matter is capable of either combining the two price points into a single model, or for developing two separate models for the two coupon variants—the choice between these options is up to the user and depends on the intended uses of the models(s).

Each CEI model is capable to rank order all the retailer's known customers (for which there has been collected purchase transaction data), in terms of a user-specified specific incremental outcome measure (e.g. units purchased of the couponed product, or revenue for the couponed product, or total store visits, total dollar spent, renewal/attrition, etc.), if offered a milk coupon, if offered a bread coupon, if offered an eggs coupon, respectively. Even customers who have not previously received a coupon can be scored. After the models are developed and validated, all customers are scored by all CEI models that the system was able to develop (based on the condition of finding enough matched customer pairs during the matching process), leading to a CEI Table:

| Customer | coupon effectiveness Indices | | |
|---|---|---|---|
| # | CEI(bread) | CEI(milk) | CEI(eggs) |
| 1 | 73 | 86 | 9 |
| 2 | 7 | 5 | 3 |
| 3 | 15 | 76 | 86 |
| ... | ... | ... | ... |
| N | 13 | 61 | 56 |

In this example, the CEI values were scaled between 0 and 100, although other scales may be used, for example, the z-scale. Uplift can also be scaled to natural scales, such as the number of incremental units bought, or incremental $ spent (and the different implementations can be adopted based on the desired optimization formulation). Whatever the scaling, powerful information for coupon assignment purposes is often contained in the relative ranking of customers along the column dimension.

The results in this example can be interpreted in such a way that customer #1 can be swayed by a bread (milk) coupon to increase her bread (milk) purchases. In contrast, this customer cannot be moved much to increase her eggs purchases by sending an eggs coupon. A reason could be that she doesn't like eggs, regardless of the amount of the discount. An alternative explanation could be that she already buys all of the eggs that she requires, and her egg consumption cannot be further increased. Customer #2 might be a person who generally ignores coupons, or his consumption of these three products may just not be sensitive to price. But the picture might look very different if we send him a coupon for an electronics device (e.g., a GPS device, etc.), for which this table has not data yet. To obtain data concerning coupon effectiveness for a GPS device, the retailer would have to run an advance campaign offering GPS coupons, and the response data can be used in a subsequent campaign to develop a new CEI model for GPS. No matter what the individual reasons for uplift are, the information in this table is extremely actionable for a retailer seeking to increase demand or revenue through future coupon campaigns. Obviously, future campaigns should comprise a reasonably similar product universe to gain sufficient information for the coupon responses to the marketed products.

Such a table can be made available to a system, such as a Best Next Action (BNA) system as described in U.S. patent application Ser. No. 12,197,134. The BNA system uses a similar table of N customers crossed with P products, therein called the Propensity Score (PS) table, where the elements in the table are propensity scores that model the likelihood of each customer being interested in any given product. The BNA system then feeds its PS table into an optimization process for selecting the best product recommendation(s) for each customer subject to campaign constraints. The CEI Table innovation can now slide into the same optimization process, where it can replace the PS table, to achieve uplift-optimal coupon targeting.

In some cases, only specific product columns, for which reliable CEI scores exist, can be slid into the optimization. For other products, product propensity scores can still be used with advantage for targeting, as described in the previously mentioned patent application. This fallback mechanism deals with products that are new to a campaign and for which there is not sufficient previous campaign data to develop CEI models yet (such as the GPS device in the above example). In addition, there may be other cases in which it is not possible to develop a robust CEI model for any given product. Whether this is possible or not depends not only on the original data sample size but also on the data distribution and the resulting quality and quantity of the resulting (smaller) matched sample. Stated differently, propensity scores can be used when there is not sufficient campaign data to develop a CEI score.

In order to prepare tables that partially consist of CEI-valued columns and partially of propensity score-valued columns with their in general different score scales, for the optimization problem, a z-scale score transformation can be performed along the columns of the merged table. The new z-scaled scores can then be input into the optimization. This ensures that the optimization works equally effective on all products FIG. 1 is a process flow diagram 100 illustrating a method, in which, at 110, profiles characterizing each of a plurality of consumers are received. Thereafter, at 120, each profile is associated with one of a plurality of customer segments (an example of a customer segment is a matched pair). A coupon effectiveness index can be determined, at 130, using a coupon effectiveness model for each of the plurality of consumers for an offering based on the associated customer segment. The coupon effectiveness indices model characterizes causal effects estimates determined using historical data of purchases of individuals having varying coupon treatments for the offering. Subsequently, at 140, provision of at least a portion of the determined coupon effectiveness indices can be initiated.

Figure 2:
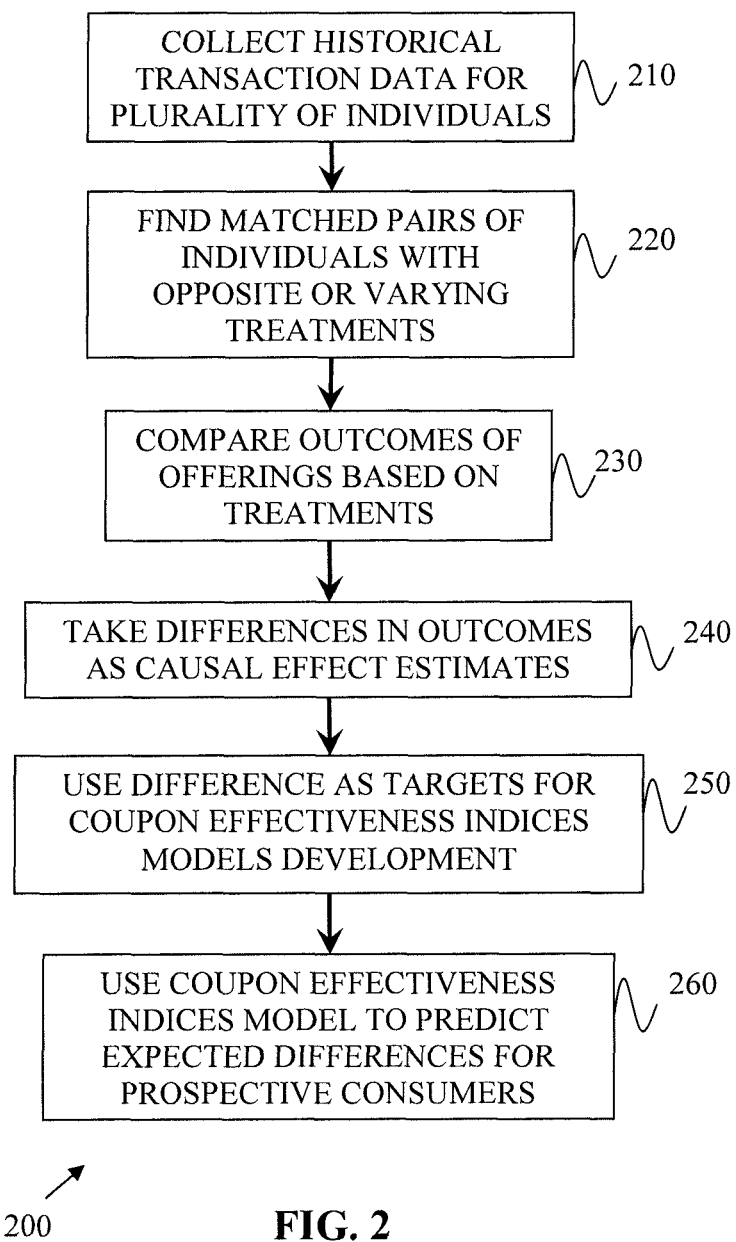
FIG. 2 is a process flow diagram illustrating a design-time technique for establishing one or more coupon effectiveness indices models and for making predictions for new customers

FIG. 2 is a process flow diagram 200 illustrating a design-time approach to development of CEI models. At 210, historical transaction data (e.g., line item purchase data, demographic data, etc.) is collected for a plurality of individuals. Thereafter, at 210 matched pairs of individuals with opposite or varying treatments are located. Outcomes of such treatments ca, at 230, be compared and differences in such outcomes can be taken, at 240, as causal effect estimates. These differences can be used, at 250, as targets for CEI model development. Subsequently, at 260, the CEI models can be used to predict differences for prospective customers.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors, the method comprising:
   receiving, by at least one data processor in an automated sub-system configured to perform parallel processing and sitting within a larger computing system for retail action management and optimization, data comprising profiles characterizing each of a plurality of consumers;
   splitting, by the automated sub-system configured to perform parallel processing, the profiles into a plurality of datasets based at least on an identifier corresponding to each of the plurality of consumers;
   associating, in parallel by at least one data processor in the automated sub-system sitting within the larger system for retail action management and optimization, each profile with one of a plurality of customer segments;
   determining, by at least one data processor in the automated sub-system sitting within the larger system for retail action management and optimization, using a coupon effectiveness indices model, a coupon effectiveness index score for each of the plurality of consumers for a future offering based on the associated customer segment, the coupon effectiveness indices model characterizing causal effects estimates determined using historical data of purchases of individuals having varying coupon treatments for the offering, the coupon effectiveness scores being used to rank order the consumers according to expected differences in potential outcomes given a change in treatment for the corresponding consumer, wherein using the coupon effectiveness indices model comprises:
      fine-binning of variables to create independent intervals where the independent intervals contribute to the coupon effectiveness index score independent of the other independent intervals;
      executing, in parallel by the automated subsystem for each of the plurality of datasets, a least-square model or a Bernoulli likelihood scorecard model to generate a set of scores corresponding to each of the plurality of datasets; and
      merging the plurality of datasets to create an omnibus score comprising the average derivative of a treatment-response curve; and
   initiating provision of at least a portion of the determined coupon effectiveness indices.

2. A method as in claim 1, further comprising:
   initiating, by at least one data processor, one or more transactions based on the determined coupon effectiveness indices.

3. A method as in claim 1, further comprising:
   optimizing, by at least one data processor, subsequent offerings according to one or more pre-defined business objectives using the determined coupon effectiveness indices.

4. A method as in claim 3, wherein the optimizing comprises: assigning, by at least one data processor, unique coupons or coupon combinations to consumers subject to at least one of (i) product and (ii) service specific coupon volume limitations.

5. A method as in claim 3, wherein the offering is a product or service coupon.

6. A method as in claim 3, wherein the offering is a product or a service.

7. A method as in claim 1, wherein determined coupon effectiveness indices are provided by at least one of (i) persisting, (ii) transmitting, and (iii) displaying at least a portion of the determined coupon effectiveness indices.

8. A method as in claim 1, wherein the historical data comprises line item transaction data to analyze and identify historical coupon marketing targeting activity and resulting customer purchase activities.

9. A method as in claim 8, wherein the customer purchase activities include coupon redemption data.

10. A method as in claim 8, wherein the historical data further comprises validity periods during which a corresponding coupon was effect.

11. A method as in claim 8, wherein the historical data comprises demographic data for the individuals.

12. A method as in claim 8, wherein the historical data comprises non-purchase related data associated with historical purchases.

13. A method as in claim 1, wherein the varying coupon treatments for the offering comprise: providing a coupon or not providing a coupon to the corresponding individual.

14. A method as in claim 1, wherein the varying coupon treatments for the offering comprise: providing a coupon at one or more discount levels or not providing a coupon to the corresponding individual.

15. A method as in claim 1, wherein the customer segments comprise matched samples of treated and control units.

16. A method as in claim 15, wherein the matched samples are pair-wise disjoint.

17. A method as in claim 15, wherein non-parametric estimates of individual-level causal treatments are determined for matched pairs of treated and control units.

18. A method as in claim 15, wherein there are more than two treatment levels and a score development sample is generated with covariates and target values for each matched sample.

19. An article of manufacture comprising:
computer executable instructions non-transitorily stored on computer readable storage media, which, when executed by a computer, causes the computer to perform operations comprising:
receiving, by at least one data processor in an automated sub-system configured to perform parallel processing and sitting within a larger computing system for retail action management and optimization, data comprising profiles characterizing each of a plurality of consumers;
splitting, by the automated sub-system configured to perform parallel processing, the profiles into a plurality of datasets based at least on an identifier corresponding to each of the plurality of consumers;
associating, in parallel by at least one data processor in the automated sub-system sitting within the larger system for retail action management and optimization, each profile with one of a plurality of customer segments;
determining, by at least one data processor in the automated sub-system sitting within the larger system for retail action management and optimization, using a coupon effectiveness indices model, a coupon effectiveness index score for each of the plurality of consumers for a future offering based on the associated customer segment, the coupon effectiveness indices model characterizing causal effects estimates determined using historical data of purchases of individuals having varying coupon treatments for the offering, the coupon effectiveness scores being used to rank order the consumers according to expected differences in potential outcomes given a change in treatment for the corresponding consumer, wherein using the coupon effectiveness indices model comprises:
fine-binning of variables to create independent intervals where the independent intervals contribute to the coupon effectiveness index score independent of the other independent intervals;
executing, in parallel by the automated subsystem for each of the plurality of datasets, a least-square model or a Bernoulli likelihood scorecard model to generate a set of scores corresponding to each of the plurality of datasets; and
merging the plurality of datasets to create an omnibus score comprising the average derivative of a treatment-response curve; and initiating provision of at least a portion of the determined coupon effectiveness indices.

20. A computer implemented method comprising:
initiating, by at least one data processor, an optimization process to select a coupon to provide to a customer;
determining, by at least one data processor in an automated sub-system system configured to perform parallel processing and sitting within a larger computing system for retail action management and optimization, whether a coupon effectiveness scores generated by a coupon effectiveness indices model are available for the customer, the coupon effectiveness indices model characterizing causal effects estimates determined using historical data of purchases of individuals having varying coupon treatments for the offering, wherein using the coupon effectiveness indices model comprises:
fine-binning of variables to create independent intervals where the independent intervals contribute to the coupon effectiveness index score independent of the other independent intervals;
executing, in parallel by the automated subsystem for each of the plurality of datasets, a least-square model or a Bernoulli likelihood scorecard model to generate a set of scores corresponding to each of a plurality of datasets; and
merging the plurality of datasets to create an omnibus score comprising the average derivative of a treatment-response curve; and
identifying, by at least one data processor in the automated sub-system sitting within the larger computing system for retail action management and optimization, using the coupon effectiveness scores and at least one pre-defined business objective if it is determined that there are available coupon effectiveness scores, which of a plurality of products to offer to the customer and a type of coupon for the corresponding product to offer to the customer;
identifying, by at least one data processor in the automated sub-system sitting within the larger computing system for retail action management and optimization, using coupon redemption scores or propensity scores if it is determined that there are no available coupon effectiveness scores, which of a plurality of products to offer to the customer and a type of coupon for the corresponding product to offer to the customer, the coupon redemption scores characterizing a likelihood of the customer to redeem a coupon that does not take into account pre-defined business objectives, the propensity scores characterizing a likelihood of a customer to purchase a product that does not take into account pre-defined business objectives; and initiating, by at least one data processor in the automated sub-system sitting within the larger computing system for retail action management and optimization and based on the identifying, providing data characterizing at least one coupon.

* * * * *